(12) United States Patent
Swartwout

(10) Patent No.: US 11,305,697 B1
(45) Date of Patent: Apr. 19, 2022

(54) VEHICLE ENTRY SYSTEMS

(71) Applicant: Arizona Safari Jeep Tours, L.L.C., Sedona, AZ (US)

(72) Inventor: David C. Swartwout, Sedona, AZ (US)

(73) Assignee: Arizona Safari Jeep Tours, LLC, Sedona, AZ (US)

( * ) Notice: Subject to any disclaimer, the term of this patent is extended or adjusted under 35 U.S.C. 154(b) by 0 days.

(21) Appl. No.: 16/998,853

(22) Filed: Aug. 20, 2020

Related U.S. Application Data

(63) Continuation-in-part of application No. 29/745,745, filed on Aug. 7, 2020.

(51) Int. Cl.
*B60R 3/02* (2006.01)

(52) U.S. Cl.
CPC .................................... *B60R 3/02* (2013.01)

(58) Field of Classification Search
CPC ....................................................... B60R 3/02
See application file for complete search history.

(56) References Cited

U.S. PATENT DOCUMENTS

| | | |
|---|---|---|
| 3,394,947 A | 7/1968 | Strube, Sr. |
| 3,493,077 A | 2/1970 | Doten |
| 5,549,312 A | 8/1996 | Garvert |
| 5,816,638 A * | 10/1998 | Pool, III ............ B62D 33/0273 296/26.11 |
| 7,168,722 B1 | 1/2007 | Piotrowski et al. |
| 8,931,792 B1 | 1/2015 | Klassen |
| 9,145,092 B1 * | 9/2015 | Reynolds ................. B60N 3/02 |
| D766,157 S | 9/2016 | Reynolds et al. |
| 9,463,745 B2 | 10/2016 | Reynolds et al. |
| D775,016 S | 12/2016 | Reynolds |
| D816,009 S | 4/2018 | Reynolds et al. |
| 10,207,598 B2 | 2/2019 | Reynolds et al. |
| 2009/0079229 A1 | 3/2009 | Schmidt |
| 2013/0074686 A1 | 3/2013 | Serpeault |
| 2016/0096478 A1 | 4/2016 | Reynolds et al. |
| 2017/0174100 A1 | 6/2017 | Reynolds et al. |

FOREIGN PATENT DOCUMENTS

WO 2016054117 A1 4/2016

* cited by examiner

*Primary Examiner* — Bryan A Evans
(74) *Attorney, Agent, or Firm* — Adam R. Stephenson, Ltd.

(57) ABSTRACT

Implementations of a vehicle entry system may include an extension section configured to extend out a bed opening of a truck bed; an opening in the extension section; a first rail extending along a first side of the opening; a second rail extending along a second side of the opening; and a set of steps rotatably coupled along a third side of the opening. The set of steps may encloses the opening when rotated up toward the extension section.

20 Claims, 7 Drawing Sheets

VEHICLE ENTRY SYSTEMS

CROSS REFERENCE TO RELATED APPLICATIONS

This application is a continuation-in-part application of the earlier U.S. Design Patent Application to Dave Swartwout entitled "Vehicle Roll Cage," application Ser. No. 29/745,745, filed Aug. 7, 2020, now pending, the disclosure of which is hereby incorporated entirely herein by reference.

BACKGROUND

1. Technical Field

Aspects of this document relate generally to systems for entering and exiting vehicles. More specific implementations involve entry and exit systems for off road vehicles.

2. Background

Land vehicles generally travel across a land surface using wheels. Individuals other than the driver of the vehicle may occupy various seats inside the vehicle. Land vehicles have been designed with various features that allow them to travel across various types of terrain.

SUMMARY

Implementations of a vehicle entry system may include an extension section configured to extend out a bed opening of a truck bed; an opening in the extension section; a first rail extending along a first side of the opening; a second rail extending along a second side of the opening; and a set of steps rotatably coupled along a third side of the opening. The set of steps may encloses the opening when rotated up toward the extension section.

Implementations of vehicle entry systems may include one, all, or any of the following:

The set of steps may be coupled to retainers in the first rail and the second rail with cables.

The set of steps may include a step pan configured to substantially fully enclose the opening when the set of steps may be rotated up toward the extension section.

The set of steps, when rotated down away from the extension section, may be configured to extend at an angle to a plane formed by the truck bed.

The set of steps may be configured to provide a primary entry for passengers into the truck bed.

The system may include bench seating for 12 to 14 passengers included in a bench section configured to couple over upper edges of the truck bed and over wheel wells in the bed.

The system may include a roll cage coupled to a bumper coupled to the extension section and to midpoint supports configured to couple with a frame of a truck including the truck bed.

The set of steps may be rigid and non-articulating.

The set of steps may form a rear door to a passenger compartment formed by the extension section and a bench section.

Implementations of a vehicle entry system may include an extension section configured to extend out a bed opening of a truck bed; a bench section configured to couple over upper edges of the truck bed and over wheel wells in the truck bed; a roll cage configured to couple with a frame of a truck including the truck bed; an opening in the extension section; a first rail extending along a first side of the opening; a second rail extending along a second side of the opening; and a set of steps with a step pan rotatably coupled along a third side of the opening. The step pan may substantially enclose the opening when rotated up toward the extension section.

Implementations of a vehicle entry system may include one, all, or any of the following:

The set of steps may be coupled to retainers in the first rail and the second rail with cables.

The bench section may include bench seating for 12 to 14 passengers.

The roll cage may be coupled to a bumper coupled to the extension section and to midpoint supports configured to couple with a frame of a truck including the truck bed.

The set of steps may be rigid and non-articulating.

The set of steps may form a rear door to a passenger compartment formed by the extension section and the bench section.

Implementations of a vehicle entry system may include a passenger compartment which may include an extension section configured to extend out a bed opening of a truck bed; a bench section configured to couple over upper edges of the truck bed and over wheel wells in the truck bed; a first rail extending along a first side of the opening; a second rail extending along a second side of the opening; and a set of steps with a step pan rotatably coupled along a third side of the opening. The set of steps may form a rear door to the passenger compartment.

Implementations of a vehicle entry system may include one, all, or any of the following:

The set of steps may be coupled to retainers in the first rail and the second rail with cables.

The set of steps may be retained in a closed position using a pinned rotatable latch system.

The system may include a roll cage.

The set of steps may be rigid and non-articulating.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended vehicle entry systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such vehicle entry systems, and implementing components and methods, consistent with the intended operation and methods.

Figure 1:
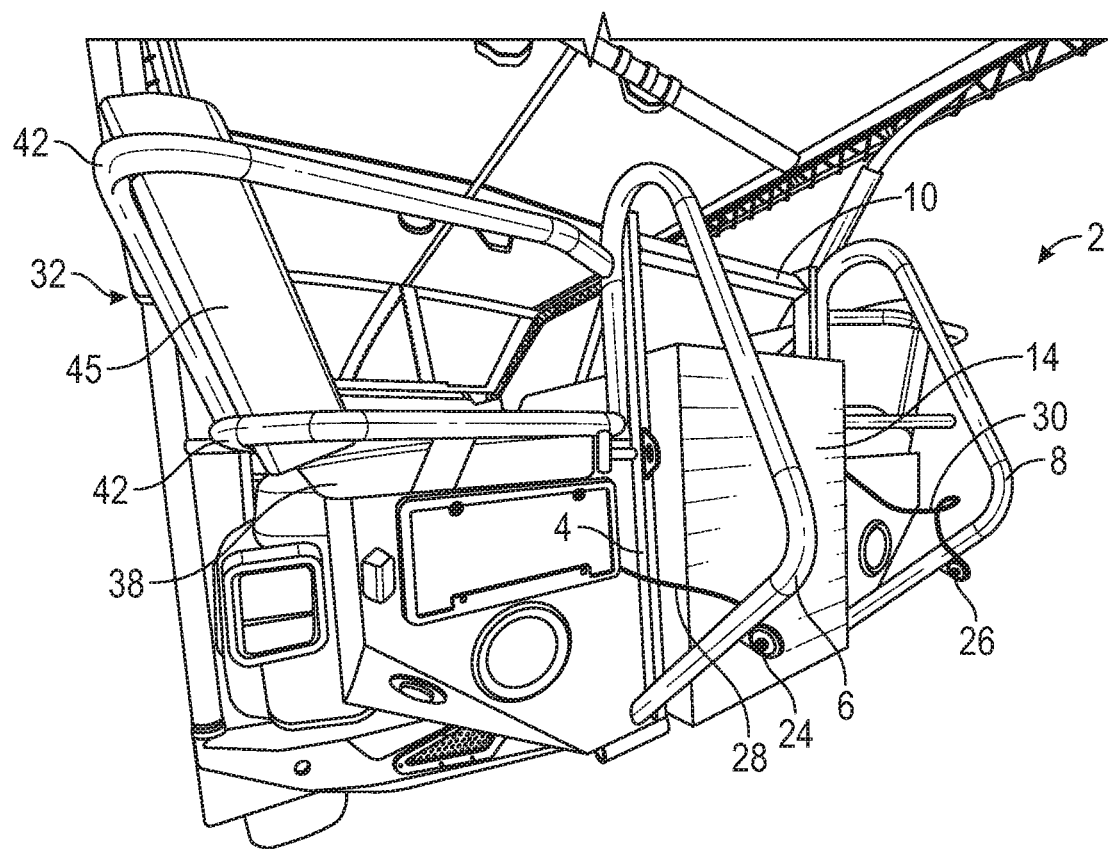
FIG. 1 is a perspective view of an implementation of an extension section.

Referring to FIG. 1, a perspective view of an implementation of an extension section 2 of a passenger compartment is illustrated. As illustrated, the extension section 2 is located in a space (not illustrated in FIG. 1) in a truck bed where the tail gate of the truck bed would have originally been located but which has been removed. In the implementation illustrated in FIG. 1, the truck illustrated is marketed under the tradename JEEP® GLADIATOR by FCA US LLC of Detroit, Mich. In the version illustrated in FIG. 1 and in FIG. 8, the truck has four doors and a version that has half doors for the two rear most doors is employed in the implementation illustrated in this document. Other truck designs and other versions of the JEEP® GLADIATOR may be employed in various implementations disclosed herein. However, any of a wide variety of other vehicle types may utilize vehicle entry systems like those disclosed herein, such as, by non-limiting example, trucks, pickup trucks, flatbed trucks, rail cars, ships, boats, private aircraft, or any other vehicle where an entry at the rear or other portion of a bed or flat section of vehicle for passengers is desired.

Figure 2:
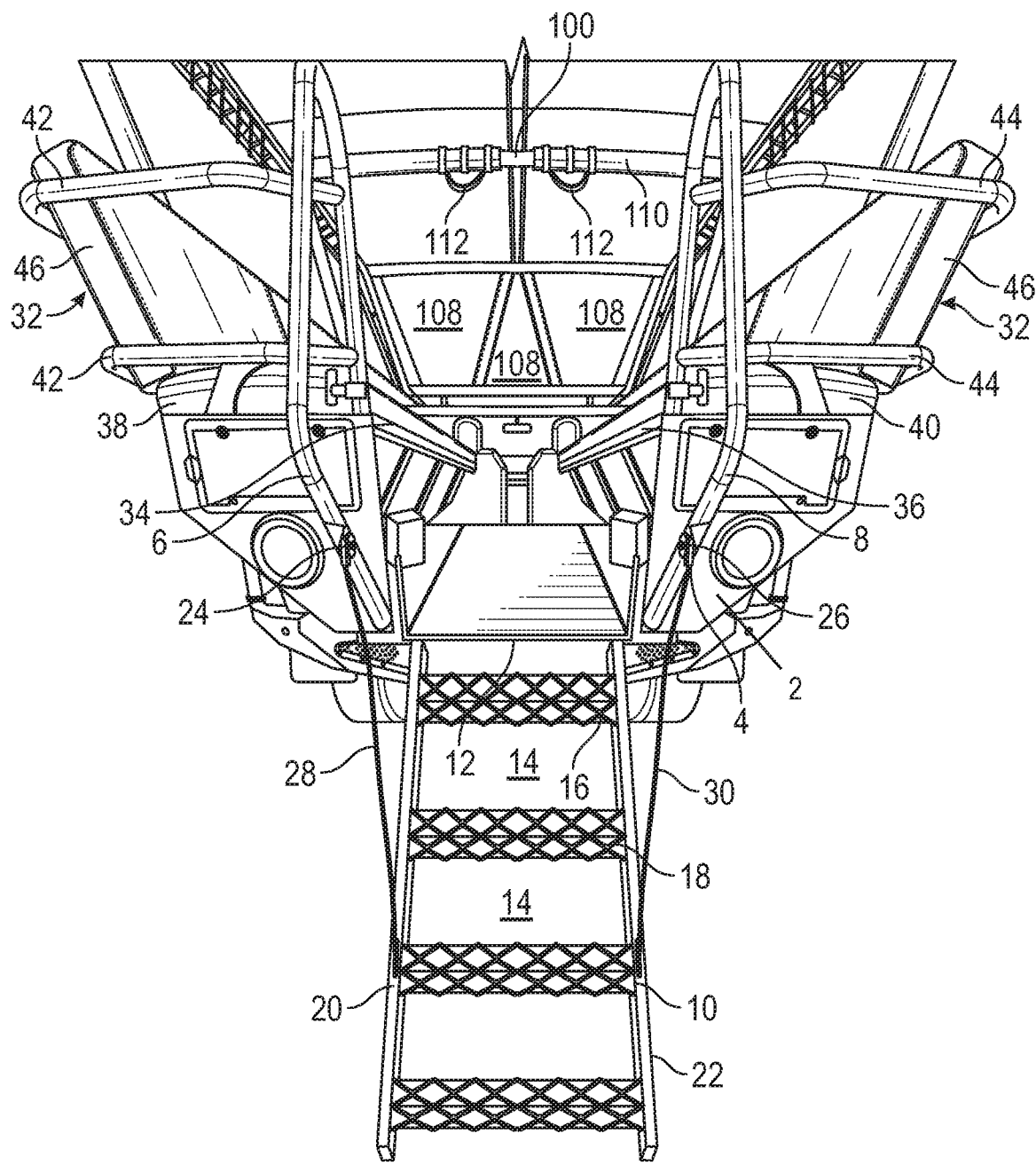
FIG. 2 is a rear view of an implementation of an extension section with a set of steps in a lowered/rotated down position.

Referring to FIGS. 1-2, the extension section 2 includes an opening 4. The opening 4 is located in part of the space that the tail gate of the truck bed would have occupied. On each side of the opening 4, rails 6, 8 are included which include sections that define the upper portion of the opening 4 in the implementation illustrated in FIGS. 1-2. FIG. 2 illustrates an implementation of a set of steps 10 that is rotatably coupled along a bottom side 12 of the opening 4 in a lowered position rotated away from the extension section 2. In various implementations, the rails assist passengers walking up and down the steps with entry into and out of the extension section 2 FIG. 1 illustrates the set of steps 10 in a raised position rotated toward the extension section 2 and illustrates a step pan 14. FIG. 2 shows how the material of the step pan 14 is located below the steps when the set of steps 10 is in the lowered position. As illustrated in FIG. 1 the set of steps 10 in combination with the step pan 14 form a rear door to the passenger compartment of the vehicle and cover or substantially cover the opening 4 when in the raised position. In various implementations, the set of steps may include 2, 3, 4, or more steps 16, 18 arranged along parallel or substantially parallel step rails 20, 22. In various implementations, the steps 16, 18, and the step rails 20, 22 may be coupled in various ways, including, by non-limiting example, screwing, bolting, welding, any combination thereof, or any method of fastening various solid structures together. In various implementations, retainers 24, 26 attached to the rails 6, 8 are coupled to the set of steps 10 (to each of the corresponding step rails 20, 22 in the illustration illustrated in FIGS. 1-2) using cable connectors 28, 30. In other implementations, however, no retainers may be used.

As illustrated in FIGS. 1 and 2, the extension section 2 is coupled to a bench section 32 that includes structures designed to form and support two sets of bench seats located around the truck bed and over the wheel wells that enclose the rear wheels of the vehicle. As illustrated in the implementation illustrated FIG. 2, the bench section 32 include platforms 34, 36 on which the structure of bench seats 38, 40 is coupled. Two sets of rails 42, 44 are coupled to the platforms 34, 36 and used to support the seat back sections 46, 48 for the bench seats 38, 40. As illustrated, the resulting structure couples the bench section 32 over the upper edges of the truck bed. In various implementations, the bench seating may be designed to accommodate a wide number of adult passengers such as, by non-limiting example, 8, 9, 10, 11, 12, 13, 14, or more passengers.

As illustrated in FIGS. 1-2, the set of steps 10 is non-articulating, meaning that the steps 16, 18 are fixedly attached along the step rails 20, 22 which are also rigid and do not bend or articulate along their length. Because the set of steps 10 are non-articulating, they can support the seat pan 14 and also form a rigid rear door the passenger compartment in the truck bed. Because the set of steps 10 are non-articulating, the mechanical complexity of the system is reduced and the set of steps 10 is capable of forming a rigid, fixed rear door. In various implementations, the set of steps 10 are rotatably coupled to the bottom edge of the opening 4 using, by non-limiting example, hinges, spring-biased hinges, pins, or any other system for rotatably coupling two fixed structures together. Also as illustrated in FIGS. 1-2 and in the other figures in this document, the set of steps 10 forms the primary entry for passengers into the truck bed. In some implementations, the set of steps 10 may be the only entry for the passengers; in other implementations, while the set of steps 10 may be the primary entry, there may be a secondary entry available through a side door or driver's side or passenger door.

Figure 4:
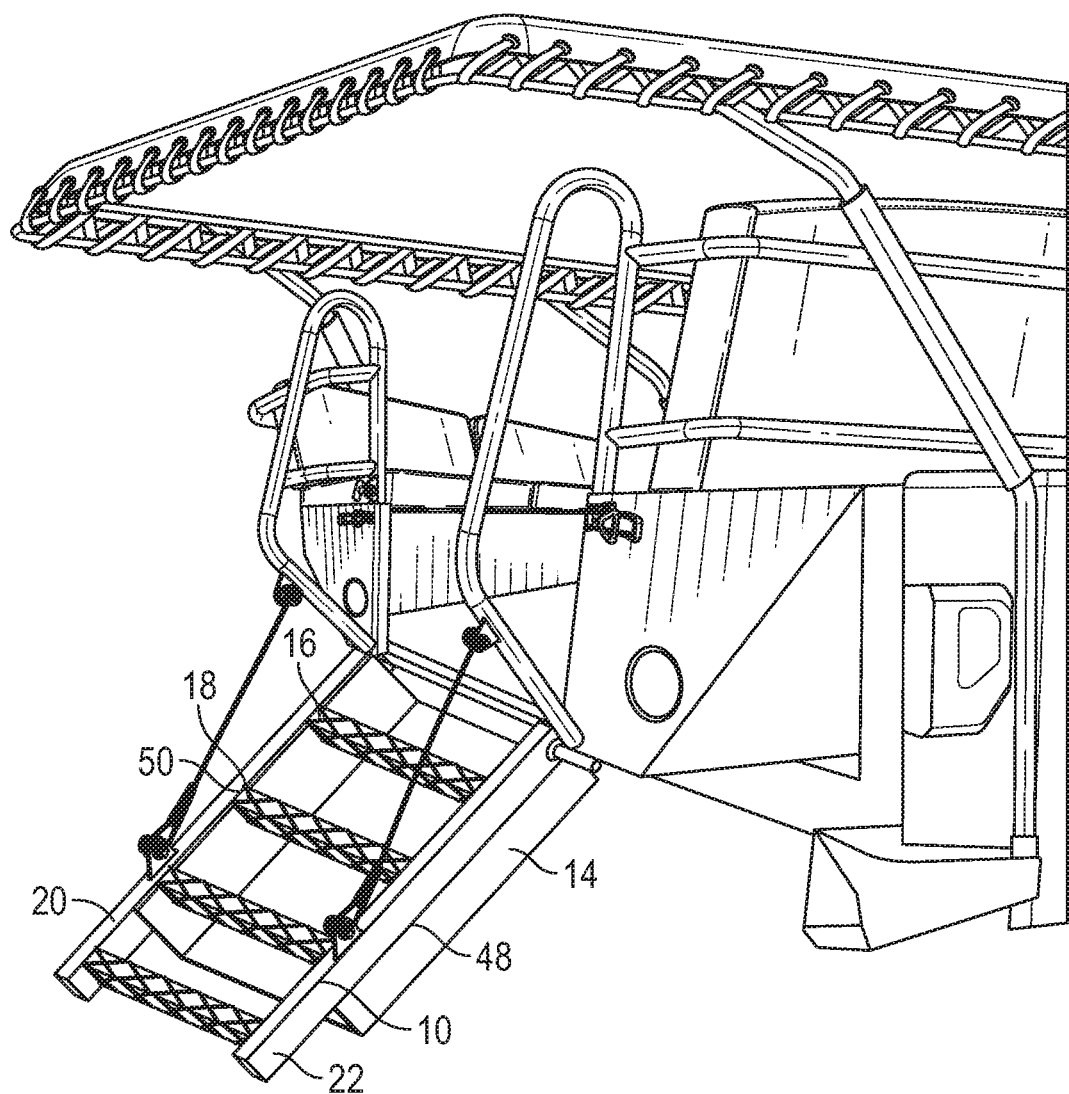
FIG. 4 is a perspective view of an implementation of an extension section with the set of steps in the lowered/rotated down position showing a latching system implementation.

FIG. 4 is a perspective view of the set of steps 10 in the open position which also illustrates the side structure of the step pan 14 indicating that the step pan 14 can extend away from the step rails 20, 22 a desired distance in some implementations. In other implementations, the step pan 14 may be coupled directly along an edge 48 of the step rails 20, 22 opposite the edge 50 the steps 16, 18 are coupled along.

Figure 5:
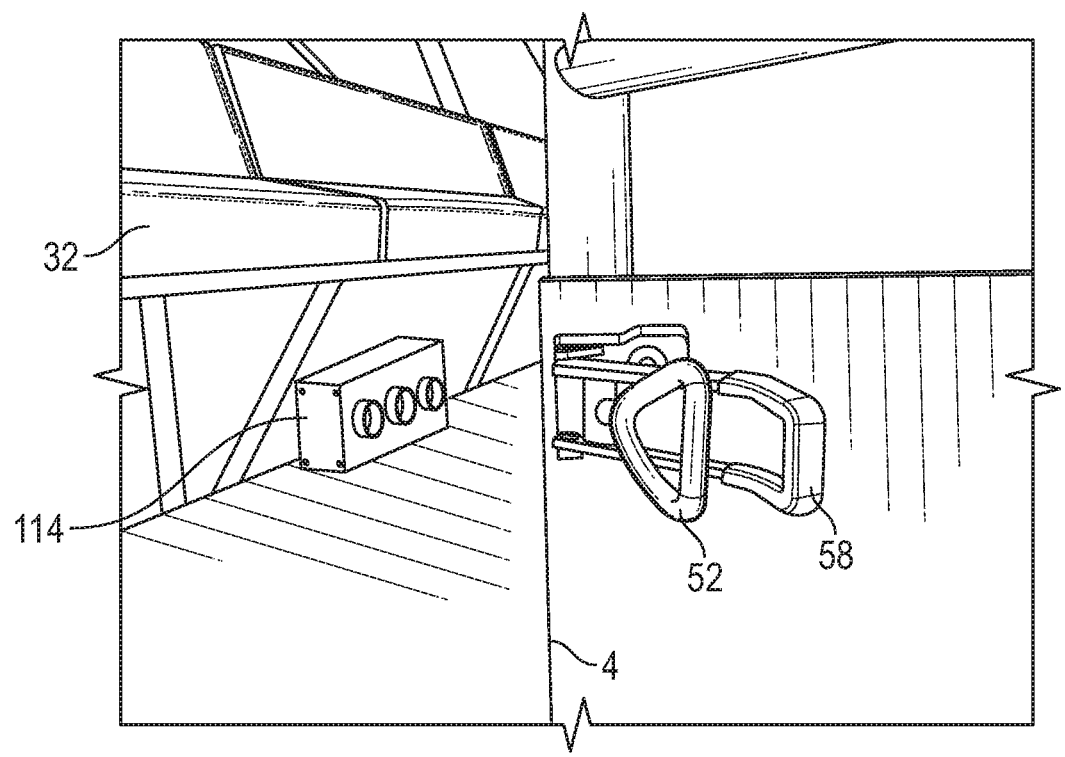
FIG. 5 is a perspective view of a latch system implementation on a right side of an opening in an implementation of an extension section.
Figure 6:
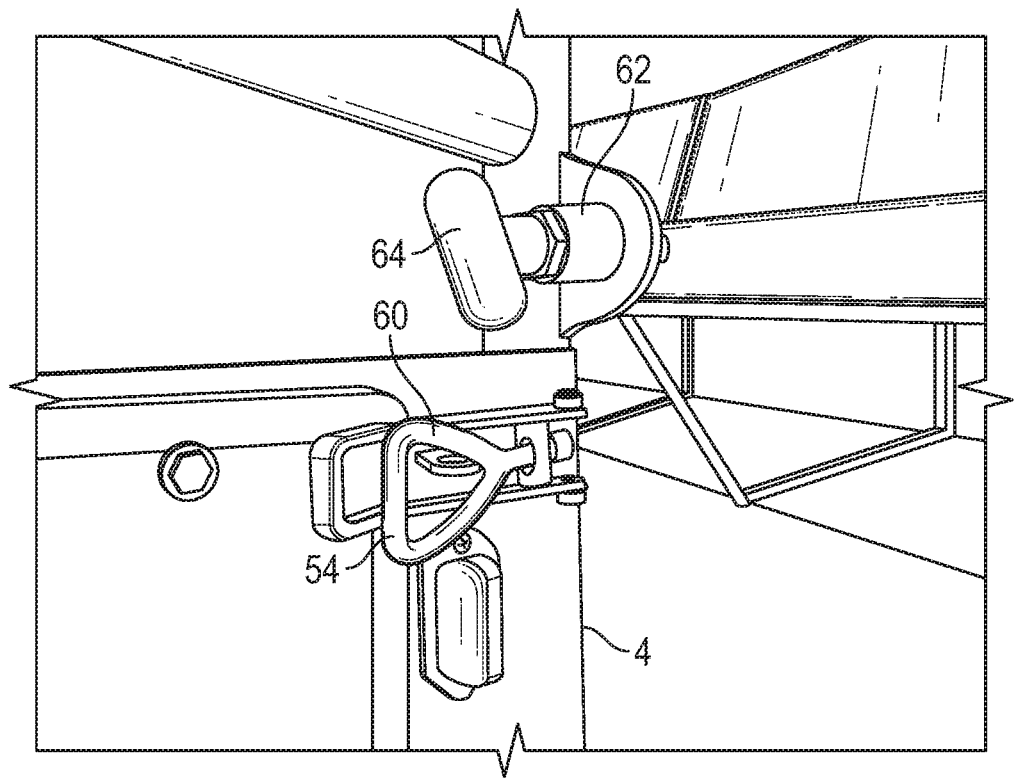
FIG. 6 is a perspective view of a latch system implementation on a left side of an opening in an implementation of an extension section.
Figure 7:
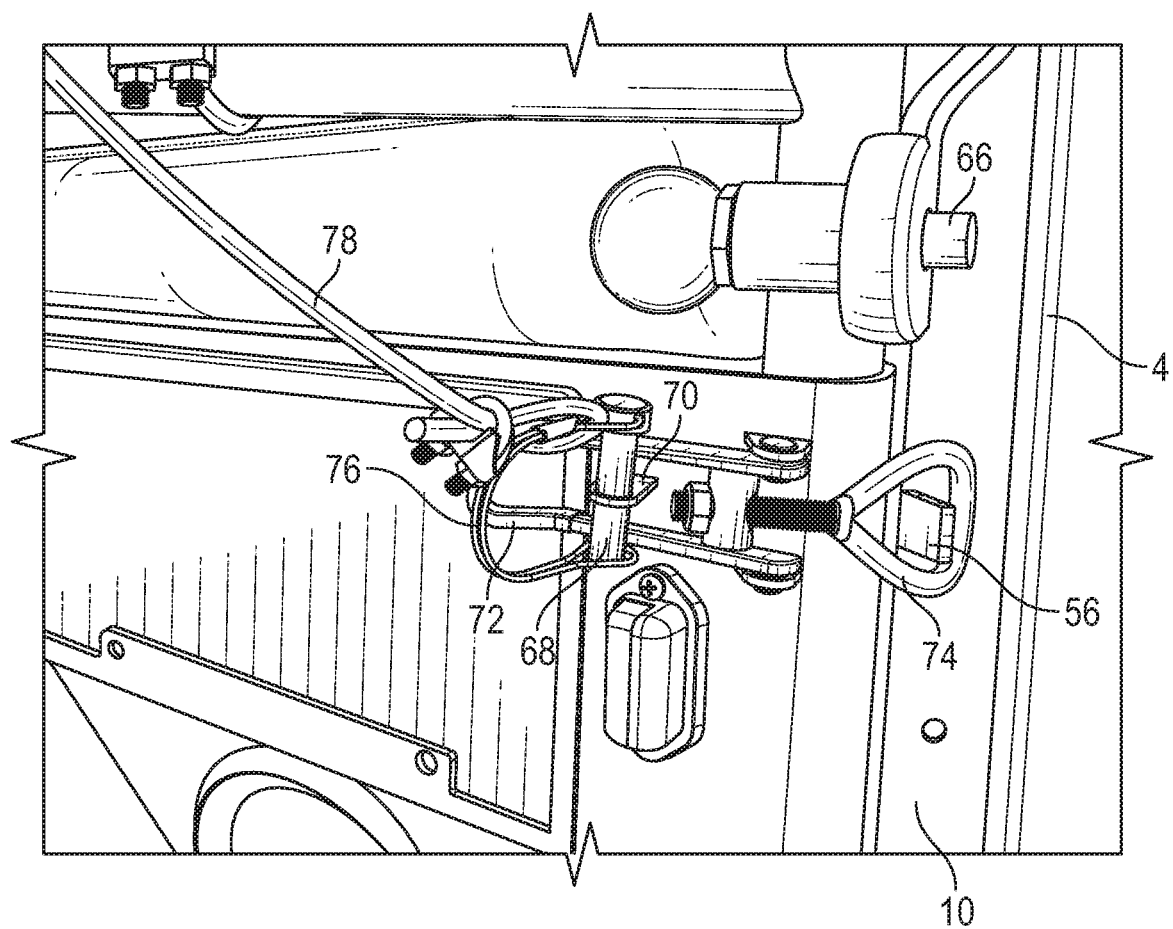
FIG. 7 is a perspective view of a latch system implementation including a pin on a left side of an opening in an implementation of an extension section.

Referring to FIGS. 5-7, the set of steps 10 may be coupled to cover the opening 4 through a variety of latching systems. FIGS. 5 and 6 illustrate a first system that includes two rotating latches with catches 52, 54 designed to engage with corresponding latch projections (see projection 56 illustrated in FIG. 7) on each side of the set of steps 10. After engagement of the catches 52, 54, latch handles 58, 60 are used to draw the catches 52, 54 toward the sides of opening 4, thus retaining the set of steps 10 in the opening 4. As an additional portion of the system designed to prevent the set of steps 10 from inadvertently dropping under gravity force if the two latches release, a biased locking pin 62 is employed that is designed to rest against an outer edge of one of the step rails 20, 22, thus preventing the step rails 20, 22 from rotating away from the extension section. In other implementations, however, the biased locking pin 62 may fit into a corresponding locking pin opening in the step rails, also preventing the set of steps from rotating away from the extension section. The locking pin 62 is moved into and out of the locking pin opening against the bias using handle 64. In various implementations, the bias is provided by a spring disposed around the locking pin 62 and retained within a tube into which the locking pin 62 passes.

In the latch system implementation illustrated in FIG. 7, one of the latches adjacent to the locking pin 66 includes a retaining pin 68 designed to pass through a retaining projection 70 fastened to the surface of the extension section. As illustrated, the length of the retaining pin 68 is designed to hold both sides of the latch handle 72 against the surface of the extension section, allowing the catch 74 to continue to retain the projection 56 in place, thus keeping the set of steps 10 in place. In various implementations, a pin retainer 76 is used that extends from one of the end of the retaining pin 68 to the other, thus keeping the pin from sliding out of the retaining projection 70. To prevent loss of the retaining pin 68, a cable 78 may be coupled to the retaining pin 68 and coupled to a portion of the extension section to hold the retaining pin 68 while it is removed from the latch during operation of the set of steps 10.

Figure 8:
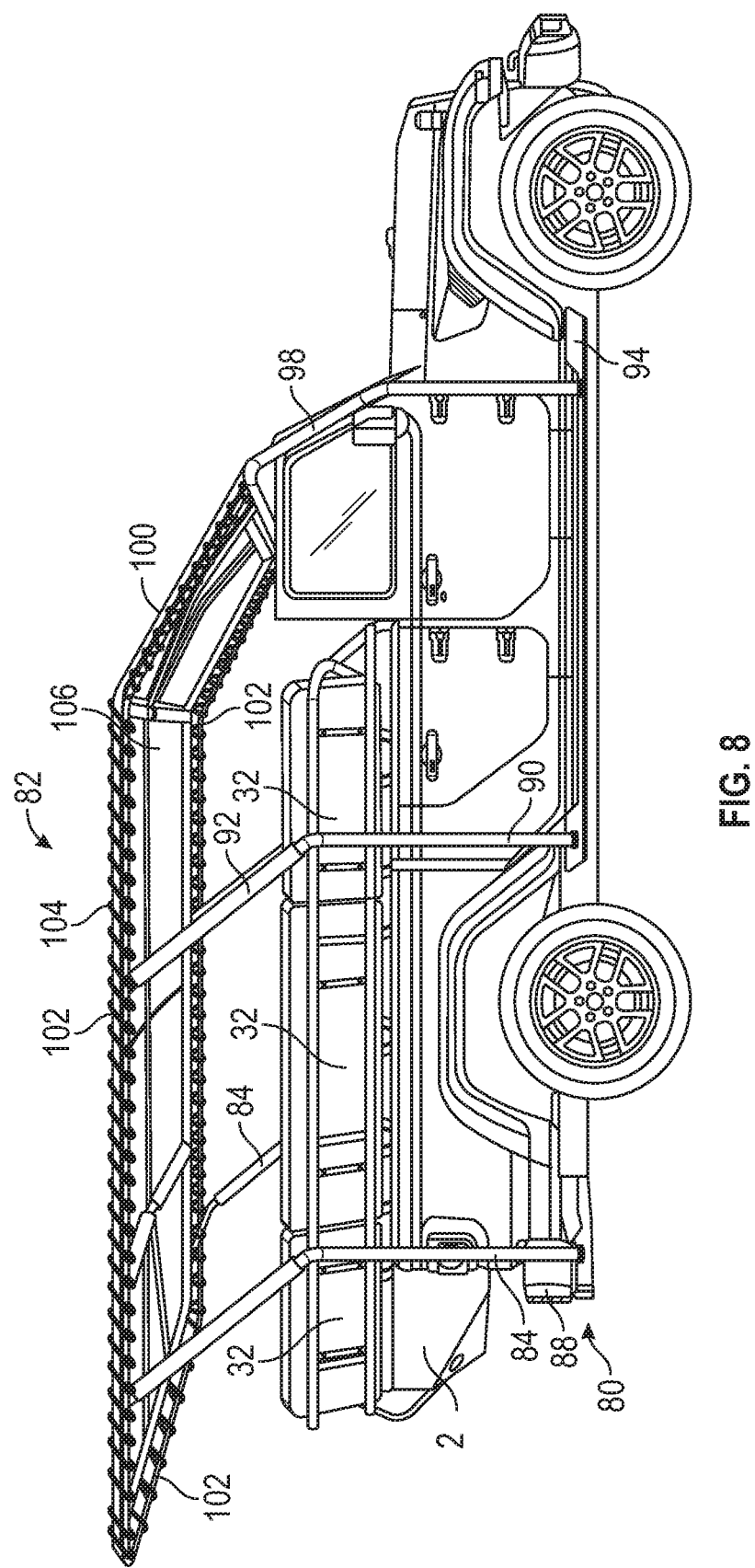
FIG. 8 is a side view of a vehicle illustrating a roll cage implementation in combination with an extension system implementation and bench section implementation forming a part of a passenger compartment implementation.

Referring to FIG. 8, the extension section 2 is coupled to bench section 32 and both are coupled into the truck bed of the truck. Together the extension section 2 and bench section 32 form a passenger compartment 80 in which passengers are able to occupy the vehicle during travel of the vehicle. Because of the use of the extension section 2, the number of the seat belted passengers that the truck is increased beyond the original number of seat belted passengers the truck was originally designed to include (12 in this implementation versus 5 as originally equipped). This may allow the truck to be more effectively used when carrying out various entertainment activities, such as off-road tours. As illustrated in FIG. 8, in various implementations, the passenger compartment 80 may be used in combination with a roll cage 82 designed to ensure passenger safety in case the truck rolls. The roll cage 82 includes supports 84, 86 that couple to bumper 88 above which the extension section 2 extends. The roll cage 82 also includes midpoint supports 90, 92 that respectively couple to a first end of a first running board 94 and first end of second running board (not illustrated in FIG. 8) which are connected to the frame of the truck. The roll cage 82 also includes forward supports 98 which also respectively couple to a second end of the first running board 94 and second running board. In this way, the roll cage 82 is secured to the frame of the truck over the passengers.

Figure 3:
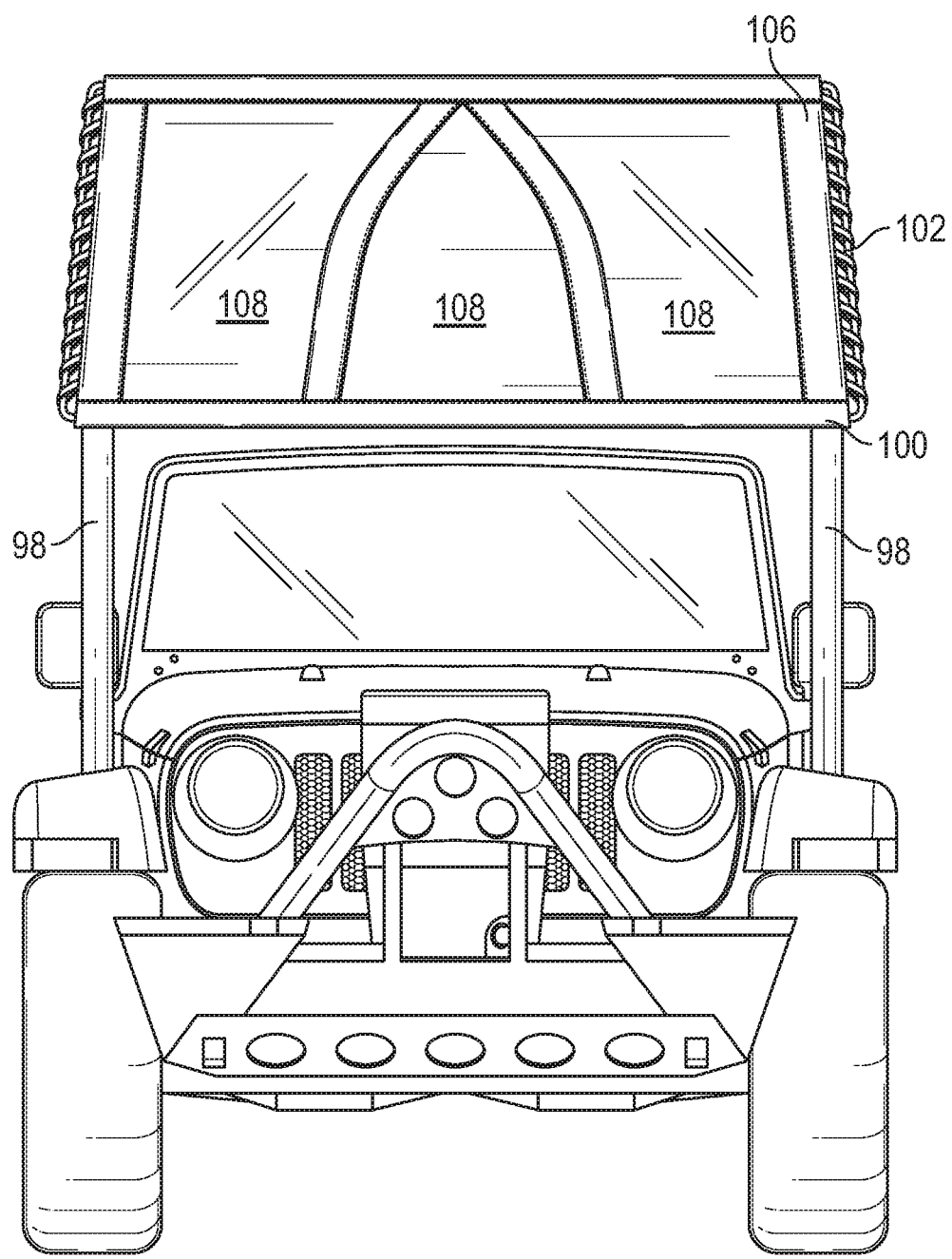
FIG. 3 is a front view of a roll cage implementation on a vehicle implementation illustrating front panels.

As illustrated in FIG. 8, the roll cage 82 includes a set of primary roof members 100 which form the main structure of the upper portion of the roll cage 92 and couple with the supports 84, 86, the midpoint supports 90, 92, and the forward supports 98. The roll cage 82 also includes a set of secondary roof members 102 used to support lashings 104 designed to hold roof 106 to the roll cage 92. FIG. 3 illustrates a front view of the roll cage 82 illustrating the forward supports 98, the primary roof members 100, and the secondary roof members 102. In this implementation, clear sections 108 in the roof 106 are included that allow the passengers to see through the forward portion of the roof 106 while shielding them from wind, dirt, and precipitation. The clear sections 108 may be made of poly(methyl methacrylate) in various implementations to form a stiff, clear panel. In other implementations, the clear sections may be formed of a clear flexible material such as, by non-limiting example, a rubber, a plastic, polycarbonate, or another wind-resistant clear material. Referring to FIG. 2, a view of the clear sections 108 from the rear of the truck is illustrated. FIG. 2 also illustrates that the primary roof members 100 may support additional structures like padding 110 or handholds 112 in various implementations.

A wide variety of other structures and systems may be incorporated in various implementations of passenger compartments. Referring to FIG. 5, a heating system 114 is illustrated incorporated into the bench section 32. In this implementation, the heating system 114 works to allow heat from the engine compartment/heating system of the truck to be distributed below the bench seats of the passenger compartment. When used in combination with additional curtains along the side edges and rear of the roll cage, the heating system 114 may allow the passenger compartment to be heated above the ambient conditions, increasing the comfort of the passengers therein. In various implementations, the heating system 114 may employ hot water, or may heat air directly. In various other implementations, a hot water system may be included that heats water via the engine or via electrical power from the electrical system of the truck. In various implementations, the bench seats may include heating elements connected with the electrical system of the truck in order to allow for heating of the seats to increase the level of passenger comfort during cold conditions. Other systems and structures may be including in various implementations, such as my non-limiting example, seat belt systems, water storage systems, fire suppression systems, fire extinguishers, or other systems designed for passenger comfort or safety.

In places where the description above refers to particular implementations of vehicle entry systems and implementing components, sub-components, methods and sub-methods, it should be readily apparent that a number of modifications may be made without departing from the spirit thereof and that these implementations, implementing components, sub-components, methods and sub-methods may be applied to other vehicle entry systems.

What is claimed is:

1. A vehicle entry system comprising:
   an extension section configured to extend out a bed opening of a truck bed;
   an opening in the extension section;
   a first rail extending along a first side of the opening;
   a second rail extending along a second side of the opening; and
   a set of steps rotatably coupled along a third side of the opening;
   wherein the set of steps fully encloses the opening when rotated up toward the extension section.

2. The system of claim 1, wherein the set of steps are coupled to retainers in the first rail and the second rail with cables.

3. The system of claim 1, wherein the set of steps comprises a step pan configured to substantially fully enclose the opening when the set of steps are rotated up toward the extension section.

4. The system of claim 1, wherein the set of steps, when rotated down away from the extension section, is configured to extend at an angle to a plane formed by the truck bed.

5. The system of claim 1, wherein the set of steps are configured to provide a primary entry for passengers into the truck bed.

6. The system of claim 1, further comprising bench seating for 12 to 14 passengers comprised in a bench section configured to couple over upper edges of the truck bed and over wheel wells in the bed.

7. The system of claim 1, further comprising a roll cage coupled to a bumper coupled to the extension section and to midpoint supports configured to couple with a frame of a truck comprising the truck bed.

8. The system of claim 1, wherein the set of steps are rigid and non-articulating.

9. The system of claim 1, wherein the set of steps forms a rear door to a passenger compartment formed by the extension section and a bench section.

10. A vehicle entry system comprising:
an extension section configured to extend out a bed opening of a truck bed;
a bench section configured to couple over upper edges of the truck bed and over wheel wells in the truck bed;
a roll cage configured to couple with a frame of a truck comprising the truck bed;
an opening in the extension section; and
a set of steps with a step pan rotatably coupled along a side of the opening;
wherein the step pan fully encloses the opening when rotated up toward the extension section.

11. The system of claim 10, wherein the set of steps are coupled to retainers in a first rail and a second rail with cables.

12. The system of claim 10, further wherein the bench section comprises bench seating for 12 to 14 passengers.

13. The system of claim 10, wherein the roll cage is coupled to a bumper coupled to the extension section and to midpoint supports configured to couple with a frame of a truck comprising the truck bed.

14. The system of claim 10, wherein the set of steps are rigid and non-articulating.

15. The system of claim 10, wherein the set of steps forms a rear door to a passenger compartment formed by the extension section and the bench section.

16. A vehicle entry system comprising:
a passenger compartment comprising:
an extension section configured to extend out a bed opening of a truck bed;
a bench section configured to couple over upper edges of the truck bed and over wheel wells in the truck bed; and
a set of steps coupled to step rails rotatably coupled along a side of the opening;
wherein a step pan coupled to the step rails opposite the set of steps forms a rear door to the passenger compartment.

17. The system of claim 16, wherein the set of steps are coupled to retainers in the first rail and the second rail with cables.

18. The system of claim 16, wherein the set of steps are retained in a closed position using a pinned rotatable latch system.

19. The system of claim 16, further comprising a roll cage.

20. The system of claim 16, wherein the set of steps are rigid and non-articulating.

\* \* \* \* \*